United States Patent [19]

Thompson

[11] Patent Number: 4,488,826
[45] Date of Patent: Dec. 18, 1984

[54] OFFSET WALL BEARING

[75] Inventor: Ronald J. Thompson, Howell, Mich.

[73] Assignee: Federal Mogul Corporation, Southfield, Mich.

[21] Appl. No.: 429,878

[22] Filed: Sep. 30, 1982

[51] Int. Cl.³ .............................................. F16C 9/02
[52] U.S. Cl. .................................................... 384/288
[58] Field of Search .............. 384/100, 114, 255, 322, 384/430, 431, 432, 434, 129, 273, 288, 294

[56] References Cited

U.S. PATENT DOCUMENTS

| 3,132,906 | 5/1964 | Sternlicht | 384/114 |
| 4,073,550 | 2/1978 | Yahraus | 384/228 |
| 4,235,481 | 11/1980 | Fukuoka et al. | 384/431 |
| 4,307,921 | 12/1981 | Roberts | 384/399 |

FOREIGN PATENT DOCUMENTS 699249  11/1979  U.S.S.R. ................ 384/430

Primary Examiner—Stuart S. Levy
Assistant Examiner—David Werner
Attorney, Agent, or Firm—Robert F. Hess

[57] ABSTRACT

An engine bearing or bushing having a cylindrical inner bearing surface which is slightly offset relative to the outer surface of the bearing. The amount of offset is very small and the offset is in a direction generally away from the portion of the bearing exposed to the maximum load. The inner bearing surface is offset so that the oil clearance between a journal member and the maximum load portion of the bearing is minimized to reduce oil film pressure and increase oil film thickness in that region. The offset increases the clearance between the journal member and bearing at a low load area of the bearing to increase oil flow and reduce oil temperature. The transition from the high clearance area to minimum clearance area is uniform so that the oil film thickness will also increase uniformly to its maximum potential.

5 Claims, 3 Drawing Figures

OFFSET WALL BEARING

TECHNICAL FIELD OF THE INVENTION

This invention relates to journal bearings in which an oil film or layer between the bearing surface of the bearing and a journal member is provided to lubricate and cool the bearing. The invention is particularly applicable to split bearings used in internal combustion engines to journal crankshafts and connecting rods. It may also have broader applications and be used in other environments of this general type such as bushing members.

BACKGROUND OF THE INVENTION

Sleeve type connecting rod bearings have long been used in internal combustion engines. Among other things their purpose is to transfer the power generated in the combustion chamber to the crankshaft from whence it is transferred directly to the engine flywheel and finally to some sort of drive train assembly. The purpose of the connecting rod bearing is to reduce friction between the connecting rod and the constantly cycling crankshaft on which it is journaled. Generally, the bearing surface material is an alloy having good lubricity, and good load carrying and wear characteristics, such as aluminum-tin, aluminum-lead, copper-tin and the like. Further, it is customary for most vehicular applications that the bearing surface material be metallurgically bonded to a thin steel backing strip. In any case it is well known these bearings must be constantly lubricated with oil and that to do so a clearance space must be provided between the crankshaft and the bearing surface such that the oil, which is generally introduced into the clearance space from the crankshaft, will completely fill the clearance space and constantly lubricate the bearing surface. It is also well known that if, because of journal loading, the bearing is eccentrically positioned on the crankshaft journal, the rotational movement between these two members will tend to draw the oil between the loaded faces and thereby create an oil film or wedge. This hydrodynamic wedge effect of the oil within the clearance space floats the bearing on the journal which is, of course, a desirable result. Such an oil film increases in thickness and effectiveness as the clearance space decreases. By way of example, in a typical vehicular application wherein there is used a conventional connecting rod bearing having a bearing surface concentric with the outer surface of the bearing sleeve and the center of the journal member the maximum oil film thickness is measured in terms of millionths of an inch. For this same application there is usually provided a clearance space between the crankshaft diameter and the bearing crown diameter ranging from one to four thousandths of an inch. Thus, while there is a distinct relationship between clearance space and oil film thickness, the two are not the same. The "bearing crown diameter" is the bearing inner diameter or bearing surface diameter measured along a diametric axis beginning at the point the greatest load will be exerted on the bearing.

Others have recognized the advantage of designing a connecting rod bearing such that the inner bearing surface is eccentric to the outer bearing surface and crankshaft journal in such a manner that, within the circumferential region of the bearing surface which is subjected to the greatest load, the clearance space is less than that of the above-described conventional bearing. Consequently the oil film thickness can be and is increased to its maximum load carrying capability. For typical vehicular applications as above-described an oil film thickness ranging from 25 to 50 millionths of an inch can be achieved. Such a design also offers the advantage that as a consequence of the clearance space being reduced in the region of the greatest load, the oil film pressure and thus the fatigue on the bearing material is also reduced.

One example of eccentrically designed engine connecting rod bearings is disclosed in U.S. Pat. No. 4,073,550 to Yahraus in which a thick walled half shell is provided in the high load area of the bearing and a thin walled bearing is provided in the low load portion of the bearing. In this construction an edge or lip of the thick walled bearing extends into the oil clearance area. Unfortunately, this noncontinuous surface tends to shear the oil film in this area and thereby decrease the effectiveness of the oil wedge.

U.S. Pat. No. 4,307,921 to Roberts and assigned to the assignee of this invention discloses another design intended to tailor the clearance between the journal member and bearing surface to the loading and cooling requirements of an engine bearing. The Roberts patent discloses a sleeve bearing including a bearing surface having a first portion which is concentric with the journal member and has a constant radius closely approximating the radius of the journaled member. A second portion of the bearing surface extends circumferentially outside the constant radius of the first portion to increase clearance between the bearing surface and journal member at a low load portion of the bearing. This construction quite effectively provides adequate clearance for oil in the area defined by the second portion while minimizing oil clearance and pressure about the first portion. However, the manufacture of such a bearing is complex in that two radii must be generated on each bearing half. This may be done by means of a special broach or by double boring or double broaching the bearing surface, and each such means is considered less desireable than the methods to which the present invention lends itself. Another possible disadvantage of this design is that the first and second portions of the bearing surface meet at spaced points about the circumference of the bearing and define a noncontinuous surface at that point.

SUMMARY OF THE INVENTION

The present invention maintains the advantages of these prior art eccentric bearing designs but none of the attendant disadvantages. It provides a bearing having a cylindrical inner bearing surface slightly offset from the central axis of the bearing. The offset is provided by generating the bearing surface from an axis which is slightly offset from the axis of the outer cylindrical surface of the bearing. In this way, the journal member is not centered within the bearing and results in a tight or reduced clearance on one side and increased clearance on the opposite side.

The present invention is particularly useful in angularly split connecting rods wherein the connecting rod bearing surface is offset along the parting line of the bearing generally toward the low load portion of the bearing. When the bearing surface is offset along the parting line, the bearing halves may be thus identical and manufactured to the same specifications with the same tools.

According to the invention, standard engine bearing machining techniques and tools may be used to manufacture the bearing since the bearing surface is circular as in traditional engine bearing designs. There are not edges or transition points formed on the bearing surface which can lead to accelerated, localized wear.

Other advantages of the present invention will be readily appreciated when explained in the following detailed description with reference to the accompanying drawings.

DESCRIPTION OF THE PREFERRED EMBODIMENT

Figure 1:
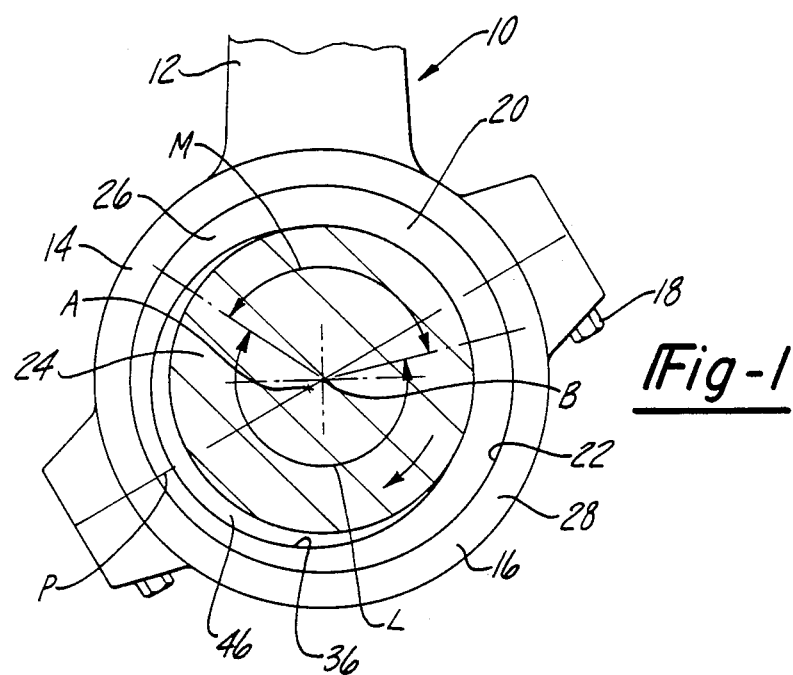
FIG. 1 is fragmentary elevational view of a rod assembly incorporating the bearing of the subject invention.
Figure 2:
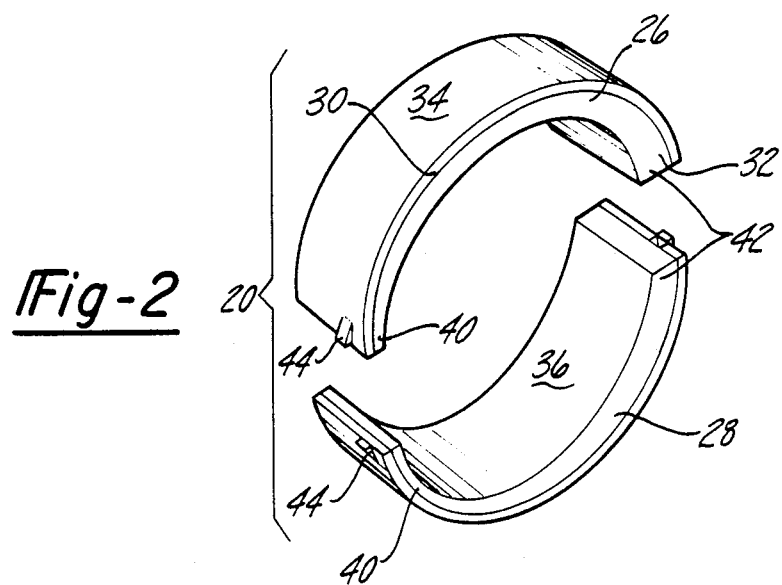
FIG. 2 is a perspective view of the bearing of the subject invention.

An angularly split connecting rod assembly is generally shown at 10 in FIG. 1. It is shown in a crank position of greatest load such that combustion chamber firing pressure is a maximum at the crown. The connecting rod assembly includes an elongated rod 12 and an integrally formed upper bearing housing 14 at one end. A connecting rod cap 16 is secured to the connecting rod 12 by means of bolts 18 as is well known in the art. A sleeve bearing 20, or journal bearing, is disposed within the bore 22 formed by the connecting rod cap and upper bearing housing. A journal member 24, or crankshaft, is disposed within the sleeve bearing for rotation.

The sleeve bearing 20 includes an upper half shell 26 and a lower half shell 28 divided along a parting line P. The half shells are preferably bimetal members including a steel back 30 of generally uniform thickness and a lining 32 of bearing material. When assembled in a connecting rod, the upper and lower half shells define a cylindrical outer surface 34 that is adapted to fit within the bore 22. The upper half shell 26 and lower half shell 28 define a cylndrical bearing surface 36 when assembled in the connecting rod. The bearing surface 36 has a central axis A, which is slightly offset from the central axis B of the bore 22. Both axes A and B lie on the parting line P. The offset of axis A from axis B is in a direction away from the maximum load area M of the bearing. Thus, each bearing half shell includes a thin wall portion 40 and a heavy wall portion 42. Each of the half shells include a locking lip 44 to prevent rotation of the bearing within the bore 22, as is well known in the art.

A clearance space 46 is provided between the journal member 24 and bearing surface 36 to permit lubrication of the bearing surface. Oil is supplied to the clearance space by various means that are well known in the art. As the shaft 24 rotates, it moves within the bearing generally about an axis corresponding to the central axis B. As the shaft 24 rotates relative to the bearing surface 36, an oil film or wedge covers the bearing surface 36 and prevents direct contact between the shaft 24 and bearing surface 36.

Figure 3:
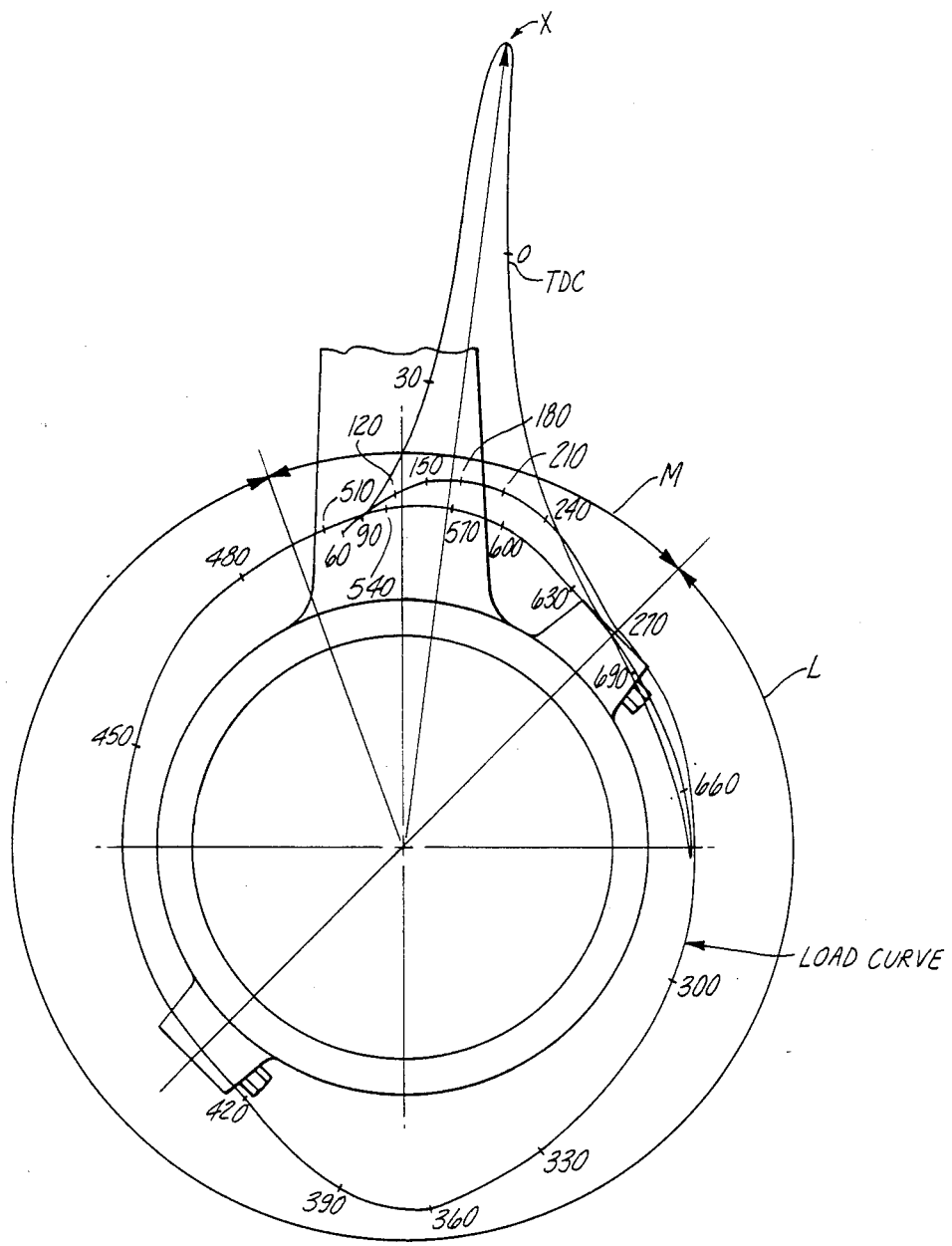
FIG. 3 is a typical polar load diagram showing the loads imparted to a connecting rod bearing by the firing pressures within a combustion chamber of an internal combustion engine.

According to the present invention, the bearing surface 36 is offset relative to the journal member or shaft 24 to provide a minimum clearance in the high load portion M and increased oil clearance in the low load portion L. These high and low load portions are shown in FIG. 3 which is a typical polar load diagram illustrating how dramatically bearing load increases in high load portion M upon ignition in the combustion chamber associated with such bearing and how in the low load portion L the load is virtually non-existent. The relative position of bearing and crankshaft shown in FIG. 1 corresponds to point X as shown in FIG. 3. By so doing, the oil film or wedge thickness is increased when the load on the bearing is greatest thereby minimizing wear and fatigue of the bearing in this area. At the same time, additional oil clearance is provided in the low load area L of the bearing which permits additional oil to circulate between the journal member and bearing surface, thereby keeping the bearing temperature within acceptable limits.

Generally, the offset is less than one half of the difference between the diameter of the inner bearing surface and the diameter of the journal member. In a typical vehicular application wherein a bearing assembly having a crown diameter of 3.003 inches is mounted upon a crankshaft journal of 3.000 inch diameter, the preferred amount of offset of the axis A of the bearing surface relative to the central axis B of the bore 22 is in the range of 0.0003 to 0.0006 inches. However, an offset range of anywhere from 0.0002 to 0.0012 would yield beneficial results over conventional bearing assembly structure in accordance with the principals of the subject invention. The amount of offset shown in the drawings is exaggerated for illustrative purposes only.

In a preferred embodiment, the sleeve bearings are identical half shells split on an angle. Being identical, the half shells can be used interchangeably and manufactured with single tooling setup. Another advantage of the shells being identical is that upper and lower half shells can be interchanged when installed.

In operation, as the journal member 24 rotates, oil is drawn from the maximum clearance area adjacent said thin wall portion 40 to the minimum clearance area adjacent said thin wall portion. As the oil is drawn to the minimum clearance area an exceptionally efficient oil flow is permitted since the change in clearance is uniform. This results in a maximum oil wedge effect developed in the same manner as when a cylindrical bearing surface is centered relative to the crankshaft bore, as is typically provided in engine bearings and yet greater in magnitude and effectiveness due to the split angle and offset axes features of the subject invention. This is in contrast to the aforementioned prior art attempts to tailor oil clearance to the varied loads which are applied to the bearing during rotation of the journal member bearing surface contours which have caused non-uniform changes in the oil clearance space which, in turn, interfere with oil flow and the formation of an effective oil wedge between the bearing surface and the journal member.

The invention has been described in an illustrative manner, and it is to be understood that the terminology which has been used is intended to be in the nature of words of description rather than of limitation, and that the values assigned to certain dimensions and tolerances have been used in a examplery sense.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An angularly split journal bearing for a connecting rod of an engine which surrounds a cylindrical portion of a crankshaft, said crankshaft being subjected to loads exerted perpendicularly to the longitudinal axis of the crankshaft, with a maximum load being exerted upon the crankshaft from one direction through a high load portion of the bearing, said bearing being split into halves on a parting line disposed at an acute angle relative to the direction said maximum load is directed and comprising a steel backing strip having a cylindrical outer surface which is received within a bore in the connecting rod, said outer surface having a central axis B, and a lining of bearing material having an inner bearing surface for journaling said crankshaft, said inner bearing surface having a constant radius and central axis A which is offset from axis B generally less than one half the difference between the diameter of the inner bearing surface and the diameter of the cylindrical portion of the crankshaft, said offset being along the parting line away from the high load portion of the bearing to provide additional clearance between the inner surface and a crankshaft at a low load portion of the bearing and reduced clearance at the high load portion of the bearing.

2. The journal bearing of claim 1 wherein said offset is in the range of 0.0003 inches and 0.0006 inches.

3. The journal bearing of claim 1 wherein said high load portion of the bearing has a thicker wall than a low load portion of said bearing which is subjected to less load than said high load portion during rotation of the bearing.

4. In the journal bearing of claim 3 wherein the wall thickness of said bearing uniformly increases from said low load portion to said high load portion and uniformly decreases from said high load portion to said low load portion.

5. In the journal bearing of claim 4 wherein said uniformly changing wall thickness defines a clearance space between a journal member and said bearing surface wherein said clearance space is minimized at said high load portion whereby the oil film pressure developed in said clearance space is minimized when the high load portion of the bearing is engaged by said journal member and the oil flow is maximized when the low load portion of the bearing is engaged by said journal member.

* * * * *